June 1, 1943. P. WEBER 2,320,959
CONTROL SYSTEM FOR VEHICLES DRIVEN BY SINGLE-PHASE CURRENT
Filed May 1, 1941
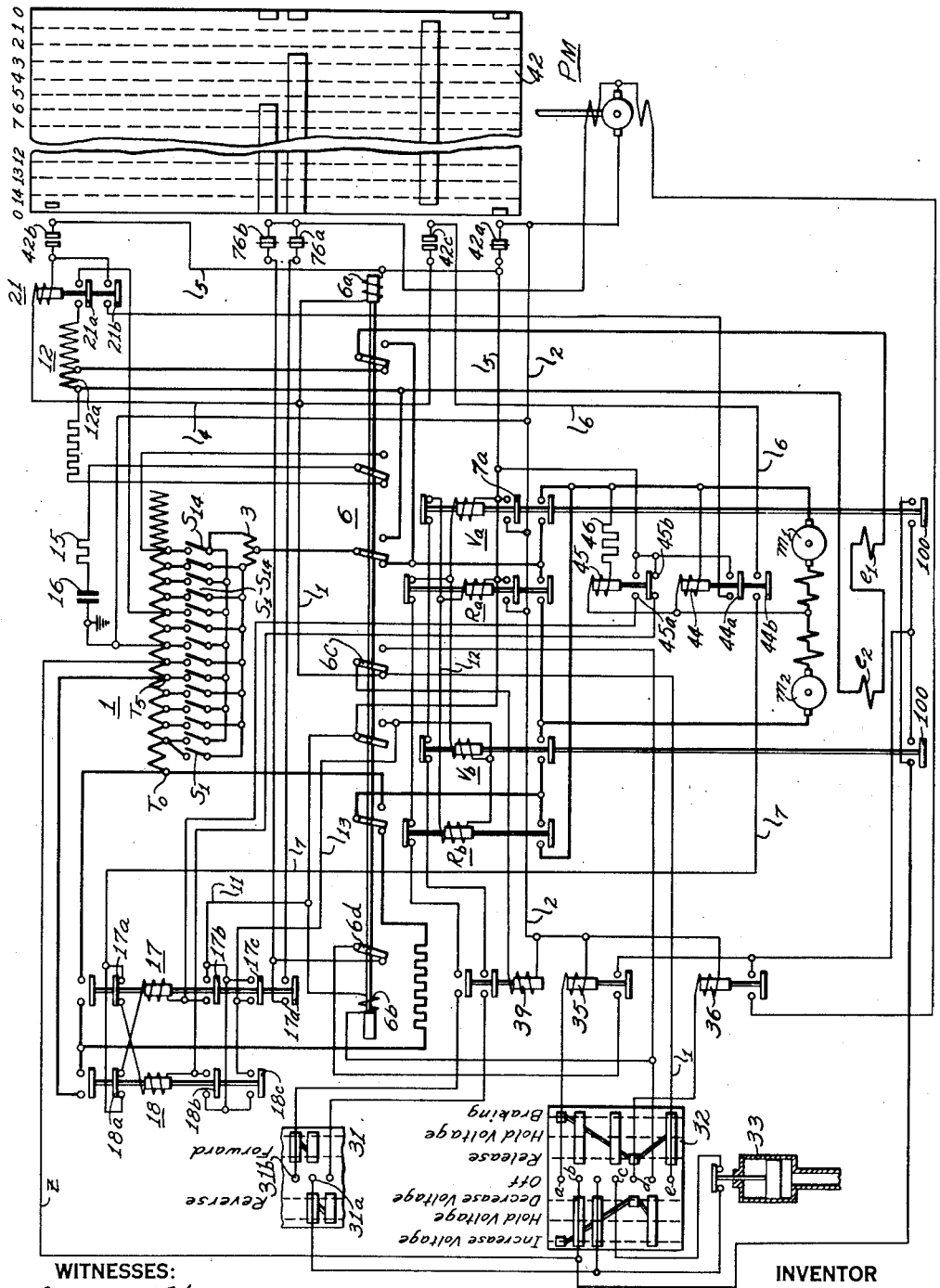
WITNESSES:
James F. Young
INVENTOR
Peter Weber.
BY
ATTORNEY Patented June 1, 1943

2,320,959

UNITED STATES PATENT OFFICE 2,320,959

CONTROL SYSTEM FOR VEHICLES DRIVEN BY SINGLE-PHASE CURRENT

Peter Weber, Berlin-Charlottenburg, Germany, assignor to Westinghouse Electric & Manufacturing Company, East Pittsburgh, Pa., a corporation of Pennsylvania Application May 1, 1941, Serial No. 391,291
In Germany January 25, 1940

10 Claims. (Cl. 172—179)

This invention relates, generally, to control systems for electrically driven vehicles and, more particularly, to a braking system for vehicles driven by single-phase current, involving separate excitation of the traction motors during the braking cycle.

In prior systems, the circuit established for the armatures of the motors when the latter must regenerate for braking purposes is connected with one lead to the tap-changer contact which, actuated by the main control outfit, will bring this lead into contact with either one of the various taps of the tap-changing transformer, while the other lead of said circuit can be connected independently of the function of said control outfit for the tap-changer to either one of a plurality of taps of the transformer. The required changes in armature-circuit connections involving the latter lead can be produced with the aid of a voltage relay that is connected to the separately excited motor.

The present invention covers a further development of a system having the foregoing features and has for one of its objects the provision of contactors for connecting the motors to the transformer independently of the functioning of the automatic control outfit for the tap-changer which are caused to close depending on the running speed of the vehicle before the main braking circuit is established.

Another object of the present invention is to provide a system in which the operation of the contactors just referred to, as well as that of a field-circuit contactor that must close the circuit for separately exciting the traction motors, is also caused to be dependent on the functioning of another relay energized by the voltage generated by the separately excited motors, in such a manner that when the motor speed drops below a given minimum value, said contactors will be prevented from closing, or, if closed, will be forced to open.

In order to explain further the nature of this invention, a description will be given of the example of its application that is represented on the drawing, which is a diagrammatic view of a control system embodying my invention.

In the connection diagram shown, I is a tap-changing transformer, and S1—S14 inclusive are the tap-changing contactors which are part of a motor-driven cam-type controller. The tap-changing transformer supplies current to the traction motors $m1$ and $m2$ through a preventive coil 3. The field windings of the traction motors are designated by $e_1$ and $e_2$. During motoring, these field windings are connected in series with the motor-armatures; during braking, they are connected to the low-voltage terminals of a field-circuit transformer 12 whose primary circuit—which contains a resistor 15 and a capacitor 16— can be connected to a tap of the tap-changing transformer 1. A field-circuit contactor 21 is provided for closing the circuit for separately exciting the traction motors. The field windings can be inserted either into the circuit comprising the motor-armatures or into the circuit provided for separate excitation by means of a two-position "motoring-braking" controller 6 which can be actuated either electro-magnetically or electro-pneumatically by means of coils $6a$, $6b$. Furthermore, there is provided for selecting the direction of travel of the vehicle a reverser comprising the "forward" contactors $V_a$, $V_b$ and the "backward" contactors $R_a$, $R_b$. The entire control outfit is controlled by means of a drum-type master controller 32. This master controller has the following operating positions; a zero or "off" position; three positions for motoring, i. e., an "increase-voltage" position, a "hold-voltage" position, and a "decrease-voltage" position; three positions for braking, i. e., a "braking" position, a "hold-voltage" position, and a "release" position. When the master controller is in the "braking" position, the cam-type controller, while being driven by the pilot motor PM, is so controlled by a current relay that the braking effort is automatically held at an appropriate value. In the "hold-voltage" braking position, the cam-type controller is held stationary in a certain braking position. In the "release" position, the cam-type controller is driven by its pilot motor in a direction such as to cause the braking effort to vanish. The outfit further comprises a braking-circuit interrupter 33 which, depending on the pressure in the main brake line, will stop the functioning of the regenerative braking system when the air-brakes are applied.

By means of two contactors 17 and 18, the traction motors can be connected—independently of the functioning of the main control outfit— at different running speeds to different taps of the transformer. The contactor 18 closes when at the start of the braking cycle the running speed of the vehicle is lower than a given value. In this case, the main traction circuit, which is connected with one lead to the preventive coil 3, is connected by 18 with the other lead to tap $T_5$ of the tap-changing transformer. When at the start of the braking cycle the running speed of the vehicle is higher than said given value (higher than 70 km./h., say), the contactor 17 closes and connects the latter lead (i. e., the lead of the motor-armature circuit whose connection to the transformer is not subject to control by the main control outfit) to the tap $T_0$ of the transformer. The functioning of the contactors 18 and 17 is controlled by a voltage relay 45 whose actuating coil is connected in series with a resistor 46 across the terminals of the separately excited motor $m_1$. This voltage relay is so designed that it will attract its armature when the running speed of the vehicle, while increasing, reaches the value of 70 km./h., say, while on the other hand the relay will drop its armature when the running speed, while decreasing, reaches the somewhat lower value of 60 km./h., say. When the running speed reaches a value such as to cause the relay 45 to attract its armature, the closing of the upper relay-contact 45a will bring about the closing of the contactor 17. On the other hand, when the running speed is so low that the armature of the relay is in the dropped position, the lower relay-contact 45b, and, by virture hereof, the contactor 18, are closed. But the closing circuits of the contactors 17 and 18 contain in addition the contacts of another voltage relay, designated by 44, whose actuating coil is also energized by the voltage across the terminals of the separately excited motor $m_1$. This arrangement is such that as soon as the speed of the motor $m_1$ drops below a certain minimum value, the contactors 17, 18 will be prevented from closing, or, if closed, will be forced to open.

The relay 44 is equipped with an additional contact that is inserted in the holding circuit of the field-circuit contactor 21. This contactor 21 is controlled by means of a snap-action contact 42b attached to an auxiliary controller drum 42 that is coupled with the cam-type controller referred to in the foregoing; said contact 42b is caused to function when the cam-type controller is moved from the zero position to the first braking position 14. The field-circuit contactor 21 cannot be permanently closed by the instantaneous functioning of the snap-action contact 42b (which occurs when the master controller is moved from the zero position towards the braking positions), unless prior to the functioning of 42b the running speed of the vehicle (and thus the voltage generated by motor $m_1$) was sufficiently high to cause the relay 44 to attract its armature. For this purpose one of the contacts of the voltage relay 44 is inserted in the holding circuit for the actuating coil of the contactor 21.

The main braking circuit proper cannot be closed until after the field circuit for the separate excitation of the motors is established and either one of the contactors 17 and 18 (which connect one of the motor-circuit leads to the transformer independently of the main control outfit) has closed. When the latter conditions are satisfied, the braking circuit is closed either by contactor $V_b$ or by contactor $R_b$ (depending on the direction of travel) of the reverser, there being inserted in the coil-circuits of these contactors interlocking contacts that are actuated by the movable members of the contactors 17 and 18 just referred to. The other contactor $V_a$ or $R_a$ (depending on the direction of travel) will directly close as soon as braking is initiated by displacing the master controller 32 in the proper direction. However, the closing circuits of the contactors $V_a$ and $R_a$ are dependent on the positions of contacts of an interlocking relay 39 which is energized only when the "motoring-braking" controller 6 is in the "braking" position. In connection herewith, the "motoring-braking" controller is equipped with an auxiliary contact inserted in the circuit of the closing coil of the interlocking relay 39, and this auxiliary contact is closed when said controller is in the "braking" position. Furthermore, the contactors $V_a$ and $V_b$ are equipped with auxiliary contacts 100 that are used in controlling the circuits of the pilot motor that actuates the cam-type controller. These pilot-motor circuits are controlled in addition by the controller relay 35 when the master controller is in the "increase-voltage" motoring position or in the "braking" position, and by the control relay 36 when the master controller is in the "decrease-voltage" position or in the "release" braking position. The pilot motor PM is of the type disclosed in Patent No. 2,082,026, issued June 1, 1937, to F. B. Powers, or in Patent No. 2,187,942, issued January 23, 1940, to J. W. Logan, Jr. and is provided with two field windings, one for each direction of rotation. The pilot motor PM is provided with two field windings, one for each direction of rotation, as described in Patent No. 2,082,026, issued June 1, 1937, to F. B. Powers.

In controlling the braking process, the control outfit described in the foregoing operates as follows.

Assume that the master controller 32 as well as the cam-type controller are in the "off" position, and that now the master controller is brought into the "braking" position. Thereupon the "motoring-braking" controller 6 is automatically brought into the "braking" position. The following control circuit for actuating 6 is established in this case: control-current supply wire Z—contacts b, e of the master controller 32—wire $l_1$—brake-control coil 6a of the "motoring-braking" controller 6—auxiliary contact 42a of the auxiliary controller drum 42—wire $l_2$—ground.

The motion of the "motoring-braking" controller from the "motoring" to the "braking" position causes the removal of the field windings $e_1$, $e_2$ from the motor circuit and connects these windings to the secondary portion 12a of the winding of the field-circuit transformer 12 for separate excitation. Said motion further causes that the interlocking relay 39 becomes energized through the auxiliary contact 6c of said controller, the control circuit in question being as follows: wire $l_1$—auxiliary contact 6c—coil of relay 39—wire $l_2$—ground. Assuming that the control drum 31 of the reverser is standing in the position "forward," contactor $V_a$ of the reverser will be the next to close, because the following control circuit has been established: control-current supply wire Z—contacts b, c of the master controller 32—the closed contacts of the braking-circuit interrupter 33—contacts 31a, 31b of the control drum 31 of the reverser—contact of the interlocking relay 39—auxiliary contact on contactor $R_b$ of the reverser—auxiliary contact on contactor $R_a$ of the reverser—closing coil of the contactor $V_a$—auxiliary contact 42a on the auxiliary controller drum 42—wire $l_2$—ground. The closing of the contactor $V_a$ produced in this manner constitutes the first step in establishing for the direction of travel in question the circuit comprising the motor-armatures. At the same time, the closing of the contactor $V_a$ causes an auxiliary contact 7a that is coupled with this contactor to short-circuit contact 42a of the auxiliary controller drum 42 (said contact 42a being closed only when this drum is in the zero position). In addition, the contacts 32b, 32a of the master controller close the coil-circuit of the control relay 35. The contact of this relay, together with the auxiliary contact 100 of the contactor $V_a$, will then close the circuit of the pilot motor provided for actuating the cam-type controller. This circuit extends from the conductor Z through contact 100 of $V_a$—the contact of relay 35—auxiliary contact 6d of the controller 6—contact 76b of the auxiliary controller drum 42—the pilot motor PM and wire $l_2$ to ground. As a result hereof, the pilot motor moves the cam-type controller from the "off" position to the first braking position 14.

While moving from the "off" position to the first braking position 14, the auxiliary controller drum 42 causes the snap-action contact 42b to close for an instant, and as a result hereof, the contactor 21 in the field circuit for separate excitation closes, the control circuit for this contactor being as follows: wire $l_1$—wire $l_4$—coil of the contactor 21—snap-action contact 42b—wire $l_5$—auxiliary contact 7a—wire $l_2$—ground. The closing of the contactor 21 will have in the first place the effect that the contact 21a of this contactor closes the primary circuit of the field-circuit transformer 12 through the resistor 15 and the capacitor 16. In the second place, the auxiliary contact 21b of said contactor closes a holding circuit which contains a contact 44a on the relay 44 whose functioning is dependent on the running speed of the vehicle. This holding circuit for said contactor 21 cannot be closed, therefore, unless the speed of the motor $m_1$ was sufficiently high to cause the relay 44 to attract its armature. This particular manner of controlling the contactor 21 in the circuit for separately exciting the traction motors has the important advantage that these motors can never be excited at standstill. For the application of an energizing voltage to the field winding of the traction motors at standstill would be very objectionable, because of the fact that the electromotive forces of pulsation induced in the short-circuited armature coils by the separately excited motor fluxes would produce heavy short-circuit currents under the brushes.

As stated previously, the relay 44 has also a contact that is inserted in the closing circuit provided for the contactors 17 and 18. The latter closing circuit follows the path: control-current supply wire Z—contacts 32b, 32e—wire $l_1$—contacts 42c—wire $l_6$—contact 44b—wire $l_7$. The wire $l_7$ then leads to a branch-point, from where one branch of the circuit passes through the auxiliary contact 17a, through the actuating coil of the contactor 18, and through the break-contact 45b of the relay 45. Since the armature of the relay 45 is in the dropped position when the running speed of the vehicle is relatively low, the contactor 18 will close in this case, thus connecting the main traction-motor circuit to the transformer tape $T_5$. On the other hand, when the running speed of the vehicle is relatively high (higher than 60 km./h., say), the other branch of the control circuit in question: wire $l_7$—auxiliary contact 18a of the contactor 18—actuating coil of the contactor 17—make-contact 45a of the relay 45—wire $l_5$—contact 7a—wire $l_2$—ground, will be closed, so that the contactor 17 will close.

When the contactor 17 or 18 closes, the auxiliary contact 17b or 18b will close a holding circuit for this contactor; this holding circuit leads, after passing through this holding contact, through the wires $l_{11}$ and $l_5$ to ground. In addition, the closing of the auxiliary contact 17c or 18c closes the closing circuit for the second contactor of the reverser, i. e., for the contactor $V_b$ when—as assumed in the foregoing—the reverser-drum is standing in the "forward" position, the control circuit in question being as follows: energized wire $l_{12}$—actuating coil of the contactor $V_b$—wire $l_{13}$—auxiliary contact 17c or 18c—wire $l_{11}$—wire $l_5$—ground. The closing of of the contactor $V_b$ completes the braking circuit comprising the motor armatures, so that regenerative braking can commence.

During the braking process, the functioning of the operating mechanism of the cam-type controller will be controlled by the current relay. The control for this operating mechanism is so arranged that when the contactor 18 is closed, the mechanism cannot turn the controller beyond the operating position 5, while with the contactor 17 closed, it cannot turn the controller beyond the operating position 2. For this purpose the closing circuit for the pilot motor that actuates said operating mechanism is provided with two parallel branches, one leading through a contact 76b of the auxiliary controller drum 42, and the other one leading through an auxiliary contact 17d of the contactor 17 and through a contact 76a of the auxiliary controller drum 42.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system for vehicles driven by single-phase current and equipped for electric braking, the combination with a motor having an armature winding and a field winding which is separately excited during regenerative braking, and a tap-changer for connecting one armature lead of the motor to various taps of a transformer, of contactors for connecting the other armature lead to one of a plurality of taps of the transformer independently of said tap-changer, and means for causing said contactors to close depending on the running speed of the vehicle before the main braking circuit is established.

2. In a control system for vehicles driven by single-phase current and equipped for electric braking, the combination with a motor having an armature winding and a field winding which is separately excited during regenerative braking, and a tap-changer for connecting one armature lead of the motor to various taps of a transformer, of a pair of contactors for connecting the other armature lead to one of a plurality of taps of the transformer independently of said tap-changer, and a voltage relay for controlling the operation of said contactors, one of said contactors being controlled by a break-contact of the relay and the other contactor being controlled by a make-contact of the relay, the actuating coil of the relay being energized by the electro-motive force induced in the armature winding of the separately excited traction motor prior to the establishment of the main braking circuit.

3. In a control system for vehicles driven by single-phase current and equipped for electric braking, the combination with a motor having an armature winding and a field winding which is separately excited during regenerative braking, and a tap-changer for connecting one armature lead of the motor to various taps of a transformer, of a pair of contactors for connecting the other armature lead to one of a plurality of taps of the transformer independently of said tap-changer, a voltage relay for controlling the operation of said contactors, one of said contactors being controlled by a break-contact of the relay and the other contactor being controlled by a make-contact of the relay, the actuating coil of the relay being energized by the electro-motive force induced in the armature winding of the separately excited traction motor prior to the establishment of the main braking circuit, a contactor for closing the circuit for separately exciting the traction motor field, and another voltage relay whose armature is actuated by a comparatively low voltage in the armature winding of the motor, said second voltage relay having a make-contact that is inserted in a holding circuit for the closing coil of said field circuit contactor.

4. In a control system for vehicles driven by single-phase current and equipped for electric braking, the combination with a motor having an armature winding and a field winding which is separately excited during regenerative braking, and a tap-changer for connecting one armature lead of the motor to various taps of a transformer, of a pair of contactors for connecting the other armature lead to one of a plurality of taps of the transformer independently of said tap-changer, a voltage relay for controlling the operation of said contactors, one of said contactors being controlled by a break-contact of the relay and the other contactor being controlled by a make-contact of the relay, the actuating coil of the relay being energized by the electro-motive force induced in the armature winding of the separately excited traction motor prior to the establishment of the main braking circuit, a contactor for closing the circuit for separately exciting the traction motor field, another voltage relay whose armature is actuated by a comparatively low voltage in the armature winding of the motor, said second voltage relay having a make-contact that is inserted in a holding circuit for the closing coil of said field circuit contactor, a controller for controlling the operation of said tap-changer, and a snap-action-contact actuated when said controller starts to move from the zero position towards the braking positions to close the closing-coil circuit of said field-circuit contactor, whereupon said closing-coil circuit remains closed through the contact on said auxiliary relay whose actuating coil is energized by the electro-motive force of the traction motor.

5. In a control system for vehicles driven by single-phase current and equipped for electric braking, in combination, a motor having an armature winding and a field winding that is separately excited during regenerative braking, a tap-changer device for connecting one armature lead to various taps of a transformer, a pair of contactors for connecting the other armature lead to one of a plurality of taps of the transformer independently of said tap-changer, and a voltage relay whose armature is actuated by a comparatively low voltage in the armature winding of the motor, said relay having a make-contact attached to its armature and inserted in the closing-coil circuits of said contactors.

6. In a control system for vehicles driven by single-phase current and equipped for electric braking, in combination, a master controller, a motor having an armature winding and a field winding that is separately excited during regenerative braking, tap-changing contactors for connecting one armature lead to various taps of a transformer, a motor-driven controller for controlling the operation of said contactors, a plurality of reversing contactors, one of said contactors constituting the first step in establishing the main braking circuit, an auxiliary contact on said contactor, and a control relay energized through said master controller and cooperating with said auxiliary contact to apply a voltage to the circuit of the pilot motor that actuates the controller for the tap-changing contactors.

7. In a control system for vehicles driven by single-phase current and equipped for electric braking, in combination, a motor having an armature winding and a field winding that is separately excited during regenerative braking, a tap-changer device for connecting one armature lead to various taps of a transformer, a pair of contactors for connecting the other armature lead to one of a plurality of taps of the transformer independently of said tap-changer, a plurality of reversing contactors, a master controller for controlling the energization of the closing coil of one of said reversing contactors, and an auxiliary contact attached to one of said pair of contactors for closing the closing-coil circuit for another one of said reversing contactors, whereupon the closing of the latter contactor will complete the braking circuit.

8. In a control system for vehicles driven by single-phase current and equipped for electric braking, in combination, a motor having an armature winding and a field winding that is separately excited during regenerative braking, tap-changing contactors for connecting one armature lead to various taps of a transformer, a motor-driven controller for controlling the operation of said contactors, a pair of contactors for connecting the other armature lead to one of a plurality of taps of the transformer independently of said tap-changing contactors, and auxiliary contacts actuated by said motor driven controller and cooperating with auxiliary contacts attached to said pair of contactors to so control the operation of the pilot motor for driving the controller that the controller cannot be driven beyond a certain position depending on which one of said contactors is in the closed position.

9. In a control system for vehicles driven by single-phase current and equipped for electric braking, in combination, a motor having an armature winding and a field winding, a tap-changer for connecting one armature terminal of the motor to various taps of a transformer, means for connecting the other armature terminal to different taps of the transformer independently of said tap-changer, means for separately exciting the traction motor field during regenerative braking, and means responsive to the speed of the motor for controlling the operation of both of said previously named means.

10. In a control system for vehicles driven by single-phase current and equipped for electric braking, in combination, a motor having an armature winding and a field winding, a tap-changer for connecting one armature terminal of the motor to various taps of a transformer, means for connecting the other armature terminal to different taps of the transformer independently of said tap-changer, means for separately exciting the traction motor field during regenerative braking, and a pair of relays responsive to the voltage of the motor for controlling the operation of both of said previously named means.

PETER WEBER.